United States Patent Office 3,736,220
Patented May 29, 1973

3,736,220
THIN DECORATIVE SHEET AND A DECORATIVE
LAMINATE PRODUCED THEREFROM
Bipin Manubahi Shah, Bombay, India, assignor to
Formica Corporation, Cincinnati, Ohio
No Drawing. Filed Mar. 30, 1971, Ser. No. 129,624
Int. Cl. B32b 5/28, 5/30
U.S. Cl. 161—156                              10 Claims

ABSTRACT OF THE DISCLOSURE

A decorative paper sheet for use in a decorative laminate impregnated with an acrylic polymer composition and preferably with a melamine resin-acrylic polymer composition and surfaced with finely divided particles of a polymer of acrylonitrile and to the laminates produced therefrom.

CROSS-REFERENCE TO RELATED APPLICATIONS

The present invention is related in subject matter to the U.S. patent application Ser. No. 723,924, filed Apr. 24, 1968, now U.S. Pat. 3,589,974, issued June 29, 1971.

BACKGROUND OF THE INVENTION

Decorative laminates have been produced commercially in the United States and other countries of the world for a substantial plurality of years. These decorative laminates contain a plurality of laminae that are heat and pressure consolidated together to form a unitary structure. The surface sheet is a decorative sheet which may be a solid color or may carry a decorative design thereon such as a wood-grain print, floral designs or geometric figures, and the like. The decorative sheet is impregnated as a preliminary step with a noble thermosetting resin. A noble resin is recognized in the industry as being one which does not undergo any significant color deterioration during the consolidation step. The thermosetting resin is converted to the the thermoset state during the consolidation. The decorative sheet containing the noble thermosetting resin is then superimposed over one or more sheets which are generally the kraft paper sheets that have been impregnated with a thermosetting phenolic resin. As before, the thermosetting phenolic resin is converted to the thermoset state during the consolidation step. The number of core sheets can be varied very substantially depending on the thickness of the laminate ultimately desired. When extremely thin laminates are desired, only one core sheet or possibly two core sheets are used. On the other hand, it is frequently desired to make laminates that are 1/32", 1/16" or 1/8" in thickness; or if desired, in even greater thicknesses. In order to get the thicker laminates one simply increases the total number of core sheets to three, five, seven, nine or more. If desired and particularly when the decortaive sheet is a printed design, one may superimpose over the decorative sheet an overlay sheet which is generally a fine quality alpha-cellulose paper sheet impregnated with a noble thermosetting resin preferably of the same class as that used to impregnate the decorative sheet; and after the heat and pressure consolidation step is completed the overlay sheet becomes transparentized so that the decorative sheet can readily be seen through the overlay sheet. Some other protective overlay sheets have been used such as films of polyesters. In the past, most of these decorative laminates have found extensive use as horizontal and vertical decorative panels for furniture, kitchen countertops, vanitories and wall siding.

FIELD OF THE INVENTION

The concept of the present invention is in the field of decorative paper sheets for use in decorative laminates which sheets have been coated with certain soft thermoplastic polymeric compositions and preferably impregnated with a mixture of a melamine-formaldehyde resin and a soft thermoplastic acrylic copolymer and to the laminated plastic articles produced therefrom and more particularly decorative flexible laminated plastic articles which laminated articles provide better solvent resistance, impact resistance, post formability, scuff and mar resistance when used as a surfacing material for furniture, cabinets, wall panels and the like.

DESCRIPTION OF THE PRIOR ART

One of the more pertinent references of which the instant applicant is aware is the U.S. Pat. 3,220,916 which reference makes use of a hard thermoplastic acrylic copolymer to impregnate an acrylic print sheet, which print sheet is covered with a choice of surfacing layers. The U.S. Pat. 3,589,974, issued on June 29, 1971 in the names of Donald Joseph Albrinick and Alfred Thomas Guertin is related to the concept of the present invention in as much as they use a compressed layer of a fibrillated acrylic fiber paper of at least 20 pounds basis weight as the surfacing sheet in a decorative laminate wherein said fibrillated acrylic fiber paper has become transparentized by limited fusion of the fibers of the said paper during the heat and pressure consolidation step and having been substantially free of any impregnating resin prior to the heat and pressure consolidation step. The U.S. Pats. 2,628,-223 and 2,640,049 show the polmerization of acrylonitrile and are incorporated herein by reference.

SUMMARY OF THE INVENTION

This invention relates to a decorative sheet of alpha-cellulose paper coated with a soft thermoplastic acrylic copolymer composition and preferably impregnated throughout with a thermosetting melamine-formaldehyde resin and coated at least on the decorative side with a soft thermoplasic acrylic copolymer with a glass transition temperature of less than about 25° C., onto which coating on the decorative side of said decorative sheet there is deposited a substantially uniformly thick, smooth, streak-free, bubble-free, well-adhered layer of polyacrylonitrile particles in an amount sufficient to provide from about 1 to about 7 grams per square foot in a particle size varying between about 5 to 40 microns. More particularly, the decorative sheet member above is impregnated with a melamine-formaldehyde resin and with a soft thermoplastic acrylic copolymer of from 60% to 99% by weight of an alkyl ester of acrylic acid, from 1% to about 5% of an acrylic acid and from 0% to 39% of an alkyl ester of an alkyl-acrylic acid, said copolymer having a transition temperature of less than about 25° C. The decorative laminates of the present invention have a unique combination of chemical and physical properties. These properties are eminently desirable in many different areas of veneer surfacing application. The laminates can be produced at a cost which is comparative with presently used materials which have less suitable end use characteristics. The combination of physical and chemical properties can be classified into two principal sub-classes. These combinations of properties display themselves as excellent resistance to scuff, mar, abrasion, steam and stain. Secondly, these laminates display high impact strength, resistance to radial cracking, good dimensional stability, excellent formability, excellent flexibility, machinability and handleability. The thin laminates have outstanding formability; for example, a 0.017" laminate can readily be bent around a 1/8" or less outside radius.

The laminates of the present invention have three principal essential layers. Any of a plurality of conventional materials can be employed as the base or core member in the novel laminated articles of this invention. This is due primarily to the fact that the base member cannot be seen when the laminate is in use, and also because this part of the laminate is not subjected to the same degree of wear as the decorative surface. The base member functions to impart rigidity to the laminate, and comprises a solid substrate which may or may not be formed prior to the initial laminating step, e.g., a plurality of sheets of kraft paper impregnated throughout and bonded with a substantially completely cured phenolic resin which has been converted to the thermoset state during the initial laminating step, a precured plastic laminate, such as glass fiber-reinforced thermoset polyester resin laminates and the like, a wood product, such as hardboard, woodwaste or particle boards, plywood, and the like, a mineral base board, such as an epoxy-polyamine resin-treated cement asbestos board, asbestos fiber sheet impregnated with phenolic resins, sheet rock, plaster board and the like, or a combination of these substrates, e.g., a combination of a plurality of phenolic resin-impregnated kraft paper sheets over a piece of cement asbestos board, particle board, or the like. The core sheets are conventional unbleached kraft paper sheets which have been pre-impregnated with a thermosetting resin such as a thermosetting phenol formaldehyde resin. As indicated hereinabove, for very thin laminates, only one core sheet is required; but for slightly thicker or very thick laminates, one may use two, three, five, seven or eight core sheets all of which have been pre-impregnated with a thermosetting phenolic resin.

The decorative sheet is generally a very fine quality paper such as alpha-cellulose, bleached sulfite, bleached kraft or a fibrillated acrylic fiber paper and others which have been as a preferred embodiment impregnated with a thermosetting melamine-formaldehyde resin. More particularly, the melamine resin may be a conventional melamine lamination resin made by reacting melamine and formaldehyde in aqueous solution or it may be a methylated derivative of the melamine-formaldehyde reaction product. These resins are shown in the U.S. Pat. 2,197,357 which is incorporated herein by reference. The decorative sheet after the impregnation with the melamine resin is then dried and treated with a soft thermoplastic acrylic-copolymer with a glass transition temperature less than 25° C. or compatible blend of acrylic copolymers. Additionally, one may use a compatible blend of a soft thermoplastic acrylic copolymer with a hard thermoplastic acrylic copolymer such as those shown in the U.S. Pat. 3,220,916; which patent is incorporated herein by reference. When such blends of soft and hard acrylic copolymers are used, the proportions of the two components must be such that the blend still has a glass transition temperature less than about 25° C. As a consequence, if the glass transition temperature is significantly below 25° C. larger amounts of the hard thermoplastic acrylic copolymers may be used. On the other hand when the glass transition temperature of the soft thermoplastic acrylic copolymer is not appreciably below 25° C., lesser amounts of the hard thermoplastic acrylic copolymer should be used or left out altogether. The soft thermosetting acrylic copolymer is prepared by polymerizing from about 60% to about 99%, by weight, of an alkyl ester of acrylic acid and from about 1% to about 5% of an acrylic acid such as acrylic acid per se or methacrylic acid, alpha-chloroacrylic acid, and the like; and from about 0% to about 39%, by weight, of an alkyl ester of an alkyl-acrylic acid. It is required that the polymer shall have a glass transition temperature of less than about 25° C. Among the alkyl esters which may be used in preponderant amounts in the copolymer of the present invention are those prepared by reacting acrylic acid with an aliphatic monohydric alcohol containing from 1 to 8 carbon atoms such as methanol, ethanol, propanol, isopropanol, normal butanol, iso-butanol, 2 ethyl-hexanol, and the like. It is actually preferred that the polymer be only a two component copolymer comprising the alkyl ester of acrylic acid and an acrylic acid. When these two components alone are used there should be present between about 95% and 99%, by weight, of the alkyl ester of acrylic acid and correspondingly to about 5% to about 1%, by weight, of an acrylic acid. The alkyl esters of the alkyl-acrylic acid shall be present in amounts varying between about 0% and 39% based on the total weight of the reactants of the copolymer. The same monohydric aliphatic alcohols used to prepare the principal components of the copolymer can be used to make the esters of the alkyl-acrylic acid. Since alkyl esters of methacrylic acid, such as methylmethacrylate, have a tendency to diminish the soft characteristic of the thermoplastic copolymer, said alkyl ester can be left out altogether or used in less than preponderant amounts as is outlined hereinabove. The interrelated percentages set forth hereinabove in any given copolymer, terpolymer, and the like always add up to 100%.

An alternative procedure for impregnating the decorative sheet with the melamine resin and then with the soft acrylic copolymer can be accomplished by blending the melamine resin and the soft acrylic thermoplastic copolymer latex into a unitary impregnating bath; and by passing the decorative sheet therethrough one will accomplish simultaneously the impregnation of the paper fibers with the melamine resin and the coating and saturating or further impregnating of the impregnated sheet with a preponderant amount of the soft thermoplastic copolymer composition. The soft thermoplastic acrylic polymeric material used in the laminates of the present invention should have a molecular weight between about 10,000 and 1,000,000 as determined by standard intrinsic viscosity measurements.

The unbleached kraft paper which constitutes the base member and/or core sheet(s) should have a basis weight (3,000 sq. ft. ream size) of about 40 to 135 lbs. and preferably 107 lbs. is impregnated with a conventional phenolic laminating resin to a content of from 20% to 50% and preferably from about 25% to 35%, by weight, resin solids. The decorative sheet member is bonded in certain instances directly to the base member and may be comprised of an alpha-cellulose fiber paper having a basis weight (3,000 sq. ft. ream size) of about 40 to 125 lbs. and preferably 60 to 90 lbs. Said paper is suitably pigmented and/or printed before the impregnation with the melamine resin and soft thermoplastic acrylic polymeric material either simultaneously or successively in that order.

On the decorative side said impregnated and coated decorative sheet there is deposited a substantially uniformly thick, smooth, streak-free, bubble-free, well-adhered layer of particles of a polymer of acrylonitrile in an amount sufficient to provide from about 1 to about 7 grams per square foot in a particle size varying between about 5 to 40 microns. Said polymer of acrylonitrile is prepared principally from acrylonitrile per se in an amount of at least 80% and may be as high as 100% acrylonitrile in the polymer but which may contain minor amounts of other copolymerizable monomers such as up to about 20% of such monomers as the alkyl esters of an acrylic acid such as methyl methacrylate, methyl acrylate, butyl acrylate, ethyl acrylate, propyl acrylate, butyl methacrylate, ethyl methacrylate, propyl methacrylate, and modified or substituted acrylonitriles such as methacrylonitrile and the like. The amount of the polymer layer on the surface sheet is preferably about 3.5 grams per square foot.

The polyacrylonitrile polymer to be used for forming the surface of the paper sheet is obtained in a conventional manner in the form of crumb, large particle size polymer containing up to about 65% water, see U.S. Pats. 2,628,223 and 2,640,049 cited above. The crumb is diluted to about 21% solids and ground, by means of an attritor or other suitable grinding equipment so that the particle size of the polymer is reduced to a size between about 5 and 40 microns. From about 5 grams to about 33 grams of this mix, which is a relatively stable suspension of the polymer in water, is coated onto the decorative impregnated and coated print paper on the decorative side which decorative sheet has been saturated with resin. The decorative print sheet is prepared from a printed 65 pound basis weight alpha-cellulose fiber paper, onto which has been printed a wood grain pattern or a geometric design, and which has been saturated to a level of from about 30–35% with a resin consisting of from 0–40% melamine resin and correspondingly with 100%–60% of an acrylic latex polymer such as a commercially available copolymer of 98% ethyl acrylate and 2% of acrylic acid but other acrylics may be used as are described hereinabove. The finely divided polyacrylonitrile material is deposited on said impregnated and coated paper by means of a puddle fed three roll reverse coater. The water is removed by passing the coated sheet through a continuous drying oven heated to at least 125° C. The dried coated print paper is collated with the saturated base paper. The base paper is made from 107 pound basis weight unbleached kraft paper saturated to a level of from about 25–35% with a conventional thermosetting phenol formaldehyde saturating resin and coated on the reverse side with a gluable coating such as a water dispersible polyvinyl acetate composition having a molecular weight being about 20,000 and 250,000 and having a cold flow test value of from about 20 to about 2,000 and having a particle size range from about 0.1 to 25 microns containing from about 0 to 15% by weight based on the weight of the polyvinyl acetate composition solids of a plastizier and from 1% to about 10% by weight based on the weight of the polyvinyl acetate composition solids of a protective colloid for said polyvinyl acetate composition and from about 0.1% to about 3% by weight based on the total weight of the dispersion of the water soluble starch. This polyvinyl acetate composition is applied to the dried impregnated kraft paper backmost sheet as is described in detail in the U.S. Pat. No. 3,620,899, issued on Nov. 16, 1971 in the names of Peter Bernard Kelly and Gene Edward Grosheim, said patent is incorporated herein by reference. The dried coated print paper is collated with the saturated base paper or papers and with suitable surface and back release papers. Paper backed aluminum foil coated with stearic acid is a suitable surface release and silicone coated paper is a suitable back release although there are many others that could be used conventionally. A plurality of such build ups, as many as 100 but preferably 30 or more are superimposed on one another and laminated as a pack without plates in a high pressure hydraulic laminating press at 1000 to 3000 p.s.i. at a 145°–150° C. or higher for 5–30 minutes. The preferred laminating conditions are 1400 p.s.i. at 145° C. for 15 minutes. Under these conditions the particular coating is fused to form a clear, protective surface for the print. The press is cooled to 60° C. or less and the laminates separated from the release paper. These laminates may be used as decorative and protective surfaces for cabinets, furniture, wall panels and the like.

The improved laminate of the present invention is a heat and pressure consolidate assembly comprising a rigidity imparting base member such as a kraft paper sheet or sheets impregnated with a phenolic resin and a decorative sheet coated with the soft thermoplastic acrylic copolymers and preferably impregnated with a blend of certain soft thermoplastic acrylic polymers and copolymers having a glass transition temperature of less than about 25° C. and a melamine-formaldehyde resin and having coated thereon a layer of polymer particles, said particles having been transparentized and formed into a continuous coating during the heat and pressure consolidation step. The novelty of the manufacturing process is concerned primarily with coating of the polyacrylonitrile particles onto the impregnated decorative sheet.

The rigidity imparting base sheet consists of saturating grade of unbleached kraft paper with a basis weight of from about 40 pounds to about 135 pounds (3000 sq. ft. ream size) and, preferably 107 pounds which is impregnated with from about 20% to about 50% and preferably 25% to 35% resin solids of a conventional thermosetting phenol formaldehyde impregnating resin.

The coated decorative sheet consists of a pigmented alpha-cellulose paper basis weight between about 40 pounds and 123 pounds (3000 sq. ft. ream size) and, preferably 65 pounds which is printed and which is impregnated with a blend of acrylic polymers or copolymers and with melamine-formaldehyde resin and which is subsequently coated with a smooth layer of the polyacrylonitrile particles. The blend ratio of the acrylic resin to the melamine resin may be varied between about 100%/0% and 60%/40% and preferably 75/25 acrylic resin/melamine resin respectively. The total resin content used is between about 35% and 42% and preferably is 40% by weight based on the total weight of the impregnated coated alpha-cellulose paper in the dried state. A two-pass treatment may be used for the application of these resins to the paper. In the first, the paper may be impregnated with the melamine-formaldehyde resin with a 15% solids solution dissolved in water and the resin content after the first pass is about 10%. In the second pass the melamine treated paper is impregnated with the acrylic resin at a 35% solids aqueous emulsion and the total resin content after the second pass is about 40%.

The impregnated decorative sheet is coated with the layer of copolymer particles consisting of from about 80% to 100% acrylonitrile copolymerized correspondingly with from about 20% to about 0% of one or more copolymerizable comonomers. The copolymer particles or polymer particles are mixed with water to give a slurry of about 15 to 26% and preferably about 21% polymer solids and the particles in the slurry are ground to a particle size varying between about 5 and 40 microns by use of an attritor or similar grinding device. The highly thixotropic and relatively stable suspension which results is coated onto the impregnated decorative sheets at a level from about 1 to about 7 grams per sq. foot and preferably 3.5 grams per sq. foot (dry basis) by use of a conventional three roll reverse roll puddle fed coating operation at 40 to 60 feet per minute. Higher or lower coating speeds may be used but because of the thixotropy, the suspensions solids must be correspondingly higher or lower. In order that the coating be smooth and free from entrapped air, the applicator roll must be run at speeds from 1.1 to 3.0 times faster than the overall machine speed. The smooth wet coating is then dried continuously by passing the coated decorative sheet through an oven at temperatures between about 125° C. and 200° C. The coating of the dry decorative sheet is smooth, uniform and well adhered to the sheet.

In order that the concept of the present invention may be more completely understood the following examples are set forth in which all parts are parts by weight unless otherwise indicated. These examples are set forth primarily for illustration purposes and any specific enumeration of detail contained therein should not be interpreted as a limitation on the case except as is indicated in the appended claims.

EXAMPLE 1

Solid particles of ¼" in diameter of a copolymer prepared by copolymerizing 90 parts of monomeric acrylonitrile and 10 parts of monomeric methyl methacrylate are mixed with water to give a slurry with a total solids content of 21%. The slurry is ground in an attritor until the particle size of the copolymer particles in the slurry is less than 20 microns. The resulting mix is a stable thixotropic suspension of polymer in water. The suspension is coated onto a decorative sheet of printed, 65 pounds, alpha-cellulose paper impregnated with a 75/25 acrylic latex/melamine resin blend to a 40% pick up by use of a three roll puddle fed reverse roll coater. The doctor roll and the backing-drive roll are run at a peripheral speed of 50 f.p.m. and the applicator roll is run at 100 f.p.m. The gap between the doctor and the applicator rolls is adjusted so that the pick up of coating is 3.5 grams per sq. foot (dry basis). The wet coated sheet is passed continuously through a hot air oven in which the temperature is controlled at 150° C. in order to remove the water. The dried sheet has a smooth, streak-free, bubble-free, well-adhered coating of the copolymer particles on the decorative side of the printed side.

COMPARATIVE EXAMPLE 2

Example 1 is repeated in all essential details except that the copolymer particles in the slurry are ground only to about an 80-micron size. The dried sheet has a streak-free, bubble-free, well-adhered coating, but the coating contains cracks up to 1 inch long throughout.

COMPARATIVE EXAMPLE 3

Example 1 is again repeated in all essential details except that the oven temperature is reduced to 100° C. The dried sheet thus produced has a smooth, streak-free, bubble-free coating but the coating is poorly adhered to the decorative sheet and flakes off easily when the sheet is handled.

COMPARATIVE EXAMPLE 4

Example 1 is repeated in all essential details except that the applicator roll in run at the same speed as the doctor and backing-drive rolls. The dried coating contains many air bubbles as big as ⅛″ in diameter.

EXAMPLE 5

The following assembly was prepared in superimposed relationship from top to bottom: an aluminum release sheet, the coated decorative sheet of Example 1, a base sheet of unbleached kraft paper, basis weight equal to 107 pounds and impregnated with a thermosetting phenolic resin to a pick up of 27% and finally a back release sheet of silicone treated paper. Thirty such laminates were pressed together in a face to face build up. The laminates were prepared by pressing the assembly described hereinabove in a hydraulic laminating press at 1400 p.s.i., 146° C. top temperature held for 15 minutes. The time to reach this temperature equal to about 15 minutes and time to cool to 35 C. equal to 15 minutes. The laminates thus used. The laminate surfaces retain the coating defects by standard NEMA test procedure to give the results in the following table:

COMPARATIVE EXAMPLE 6

Example 5 is repeated in all essential details except that the coated decorative sheets from Examples 2 and 4 are used. The laminate surfaces retain the coating defects which are described in Examples 2 and 4 and the laminates are not satisfactory from an appearance standpoint.

EXAMPLE 7

Example 5 is repeated in all essential details except that the maximum pressure of 1100 p.s.i. was used. The laminates produced were substantially identical with those obtained in Example 5.

EXAMPLE 8

Example 5 is repeated in all essential details except that instead of using the flat-bed laminating press, the collated assembly was passed through the apparatus described in the U.S. Pat. 3,159,526 which patent is incorporated herein by the reference, with a platen temperature of 490° F. and a belt speed of 35 feet per minute. The laminates thus produced had substantially identical physical properties as those produced by Example 5.

EXAMPLE 9

The coating of the decorative sheet is increased to 7 grams per sq. foot by the procedure described in Example 1 and Example 5 is then repeated in all essential details using this differently coated sheet. The laminates thus produced are substantially like those produced in Example 5 except that improved abrasion resistance of 370 revolutions or higher are obtained.

COMPARATIVE EXAMPLE 10

Example 9 is repeated in all essential details except that the coating is reduced to less than 1 gram per sq. foot. The laminates thus produced displayed that the steam and stain resistance had deteriorated severely and that the surface of the decorative laminate was severely affected by such conventional liquids as esters, alcohols, and ketones. Lower abrasion resistance was also evident.

EXAMPLE 11

Example 5 is repeated in all essential details using the coated decorative sheet of Example 1 except that the alpha-cellulose paper is impregnated with a 90/10 acrylic latex/melamine resin blend to a 40% resin pick up. The properties of the laminates are comparable to those described in Example 5.

COMPARATIVE EXAMPLE 12

Example 11 is repeated in all essential details except that the alpha-cellulose paper is impregnated with a 50/50 acrylic latex/melamine resin blend. The laminates produced have an opaque and brittle surface.

TABLE I.—COMPARISON OF PROPERTIES

| Property | Example No. 5 value | Laminate from U.S. Pat. 3,589,974, issued June 29, 1971 | Standard ½₂″ laminate value | Test method |
|---|---|---|---|---|
| Thickness (inches) | 0.017 | 0.016 | 0.032 | |
| Abrasion: | | | | |
| Cycles | 260 | 345 | 540 | }LD1-2.01. |
| Rate | 0.06 | 0.048 | 0.059 | |
| Steam exposure, hrs. to show whitening | >24 | >24 | >4 | Sample placed face downwards 6″ over surface of boiling water. |
| Dimensional change, percent: | | | | |
| Length | 0.170 | 0.175 | 0.36 | |
| Cross | 0.550 | 0.557 | 0.74 | LD1-2.15. |
| Drop ball impact | 64–96 | 100 | 18–24 | |
| Stains: | | | | |
| Superficial | None | None | None | }LD1-2.05. |
| Severe | do | do | do | |
| Fadeometer | No effect | No effect | No effect | LD1-2.06. |
| Formability (min. radius): | | | | |
| Length | ⅛″ | ¼″ | ½″ | |
| Cross | ⅛″ | ³⁄₁₆″ | ½″ | |
| Radial crack | No effect | No effect | Cracks in std. test (4′ width). | Radial cracking control test for dec. lam. |
| Cigarette test | 17 | 10 | 58 | LD1-2.04. |
| Blister time at 225° F | >2 min | >20 sec | | NEMA LD1-2.11. |

COMPARATIVE EXAMPLE 13

Example 1 is repeated in all essential details except that the alpha-cellulose paper is impregnated with 100% melamine resin and no soft thermoplastic acrylic copolymer was present and the copolymer particles do not adhere to the decorative print.

EXAMPLE 14

Example 5 is repeated in all essential details except that the thickness of the laminate is increased to about 0.031" by adding two core sheets to the phenolic resin impregnated kraft paper to the assembly. The properties of the laminate thus produced are substantially equivalent to Example 5's laminate except for increased stiffness and the post formability is reduced to about 0.5" radius.

EXAMPLE 15

Example 5 is repeated in all essential details except that a sheet of 0.002" aluminum foil was placed below the decorative sheet and the core sheet was impregnated with the same resin blend as was used in the decorative sheet instead of a phenolic resin. The laminates thus produced were also evaluated by standard NEMA test procedures and found to have comparable properties to those described in Example 5 with the exception that the improved heat resistance gives a cigarette resistance of greater than 600 seconds.

In all of the above examples the thermosetting phenolic resin and the thermosetting melamine resins are converted to the thermoset state during the heat and pressure consolidation step.

The process for obtaining the protective surface in the laminates of the present invention is simpler and far less expensive than the processes of the prior art. One of the advantages of the laminate of the present invention over the laminate of the prior art resides in the fact that the properties of the product of the present invention are superior to the properties of the prior art in the area of blister time, which is important for post forming. The blister time of the present laminates is greater than 2 minutes as against 20 seconds at 225° F. for comparable prior art laminates. Thus the present laminates can be heated longer and to higher temperatures allowing post forming to tighten radii to a range within about ⅛" as against ¼". Additionally the bond between the surface layer and the print paper is better for the product of the present invention. With some difficulty the protective layer can be peeled off of the surface of the laminates of the prior art as is represented by the Ser. No. 723,924 filed Apr. 24, 1968. The layer of polyacrylonitrile fused on the surface of a laminate of the present invention cannot be peeled off of these laminates. These differences can be attributed to the differences in the physical nature of the two surfaces. On microscopic examination of the surface layer of the laminates are Ser. No. 723,924 it can be seen that the surface has retained much of the original fiber structure of the original paper fibers, whereas on microscopic examination of the surface layer of the laminates of the present invention it can be seen that they have retained much of the particulate structure of the original particle coating. The particle to particle fusion is sufficient to protect the laminate from degradation by abrasion, chemical agents and heat but is not sufficient to exist as a self-supporting film. For reasons which are not clearly understood, the surface formed from the particles adheres to the sublayer better than the surface formed from the acrylic fiber paper. An important final difference is the color of the two surfaces. Polyacrylonitrile discolors on heating. The material on the surface of the acrylic fiber paper laminate is slightly but distinguishably yellow because of the many heatings which the material undergoes during the complicated processing operation whereas the material on the surface of the laminates of the present case is less yellow as it undergoes fewer heatings during the simpler processing operation.

The thermosetting melamine formaldehyde resin used in all of the above examples is a standard commercially available laminating resin whereas the acrylic resin used with said melamine resin is a commercially available acrylic latex containing a copolymer of about 95 parts of ethylacrylate and 5 parts of acrylic acid.

What is claimed is:

1. A decorative sheet of alpha-cellulose paper coated at least on the decorative side with a soft thermoplastic acrylic copolymer with a glass transition temperature of less than about 25° C., onto which coating on the decorative side of said decorative sheet there is deposited a substantially uniformly thick, smooth, streak-free, bubble-free, well-adhered layer of finely divided polyacrylonitrile particles in an amount sufficient to provide from about 1 to about 7 grams per square foot in a particle size varying between about 5 and 40 microns.

2. The decorative sheet according to claim 1 in which the polyacrylonitrile is a copolymer of at least 80% of acrylonitrile monomer and the other comonomer is not more than 20% of a lower alkyl ester of an acrylic acid.

3. The decorative sheet according to claim 1 in which the decorative sheet is also impregnated with a thermosetting melamine-formaldehyde resin.

4. The decorative sheet according to claim 2 in which the decorative sheet is also impregnated with a thermosetting melamine-formaldehyde resin.

5. A heat and pressure consolidated decorative laminate comprising at least one of kraft paper core sheet impregnated with a thermosetting phenolic resin and surfaced with the decorative sheet of claim 1, wherein said thermosetting resin has become thermoset during the heat and pressure consolidation step and wherein the decorative side of said decorative sheet is exposed.

6. A heat and pressure consolidated decorative laminate comprising a plurality of kraft paper core sheets impregnated with a thermosetting phenolic resin and surfaced with the decorative sheet of claim 2, wherein said thermosetting resin has become thermoset during the heat and pressure consolidation step and wherein the decorative side of said decorative sheet is exposed.

7. A heat and pressure consolidated decorative laminate comprising a plurality of kraft paper core sheets impregnated with a thermosetting phenolic resin and surfaced with the decorative sheet of claim 3, wherein said thermosetting resin has become thermoset during the heat and pressure consolidation step and wherein the decorative side of said decorative sheet is exposed.

8. A heat and pressure consolidated decorative laminate comprising a plurality of kraft paper core sheets impregnated with a thermosetting phenolic resin and surfaced with the decorative sheet of claim 4, wherein said thermosetting resin has become thermoset during the heat and pressure consolidation step and wherein the decorative side of said decorative sheet is exposed.

9. The decorative sheet according to claim 2 in which the other comonomer is methyl methacrylate.

10. The heat and pressure consolidated laminate of claim 6 in which the other comonomer is methyl methacrylate.

References Cited

UNITED STATES PATENTS

| | | | |
|---|---|---|---|
| 3,589,974 | 6/1971 | Albrinick et al. | 161—150 |
| 2,628,223 | 2/1953 | Richards | 260—32.6 N |
| 3,574,662 | 4/1971 | Gage | 117—16 |
| 3,547,769 | 12/1970 | Albrinick et al. | 161—263 |
| 3,547,767 | 12/1970 | Keeling et al. | 161—263 |
| 3,549,403 | 12/1970 | Williams et al. | 117—21 |

GEORGE F. LESMES, Primary Examiner

G. W. MOXON II, Assistant Examiner

U.S. Cl. X.R.

161—158, 162, 251, 254, 256, 263, 413